United States Patent
Siemens

(10) Patent No.: US 6,373,374 B1
(45) Date of Patent: Apr. 16, 2002

(54) CORDLESS PHONE SYSTEM WITH SPEECH RECOGNITION ALARM

(75) Inventor: Gerhard Siemens, Borken (DE)

(73) Assignee: Siemens Information and Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/796,882

(22) Filed: Feb. 28, 2001

(51) Int. Cl.[7] .................................................. G08B 1/00
(52) U.S. Cl. ............. 340/309.15; 340/692; 340/825.75; 368/10; 368/12; 368/13; 381/110; 455/79; 455/404; 455/563
(58) Field of Search ........................... 340/309.15, 692, 340/7.1, 825.72; 381/41, 110; 367/197, 198, 199; 368/1, 10, 12, 13, 243, 244; 455/412, 413, 414, 463, 466, 79, 563, 404, 426, 556, 555; 700/94

(56) References Cited

U.S. PATENT DOCUMENTS

| | | | | |
|---|---|---|---|---|
| 5,794,142 A | * | 8/1998 | Vanttila et al. | 455/419 |
| 5,802,467 A | * | 9/1998 | Salazar et al. | 455/420 |
| 5,949,326 A | * | 9/1999 | Wicks et al. | 340/286.01 |
| 5,974,300 A | * | 10/1999 | LaPorta et al. | 455/31.2 |
| 6,292,668 B1 | * | 9/2001 | Alanara et al. | 455/466 |

* cited by examiner

Primary Examiner—Edward Lefkowitz
Assistant Examiner—Davetta W. Goins

(57) ABSTRACT

A method for transmitting an alarm over a cordless broadcast system having a base station in communication with a mobile unit and a computer. The computer includes a speech recognition system. The method includes requesting an alarm setting for a specified time with a voice command at the mobile unit and storing the requested alarm setting in the computer. The alarm is broadcast at the specified time to the mobile unit.

24 Claims, 5 Drawing Sheets

CORDLESS PHONE SYSTEM WITH SPEECH RECOGNITION ALARM

FIELD OF THE INVENTION

The present invention relates generally to personal telephone systems configured to transmit and receive digital signals between mobile sets and fixed stations in a cordless system. More particularly, the present invention relates to an alarm system with speech recognition user interface for use in the cordless phone system.

BACKGROUND OF THE INVENTION

Conventional alarm clocks are often difficult to program and provide only a limited selection of wake up signals (e.g., buzzer, music). Alarms clocks are typically located in places such as bedrooms which also contain telephones. Cordless telephones are typically placed in a bedroom if a house is not wired with telephone jacks in the bedroom.

Time Division Multiple Access (TDMA) cordless phone systems provide a base unit capable of providing connections for a plurality of mobile units, such as telephone handsets. Such TDMA systems use time division to provide a plurality of slots, where the base (fixed unit) transmits to an individual mobile (portable) unit during a particular slot of time. One standard for TDMA systems is the Digital European Cordless Telecommunications (DECT) common interface standard described in ETS 300 175-2 and ETS 300 175-3, published by the European Telecommunication Standards Institute. The DECT standard is also discussed in U.S. Pat. No. 6,078,574 entitled "Process and Apparatus for Action Control in a Time Slot Method", to Boetzel et al., issued Jun. 20, 2000 and U.S. Pat. No. 6,088,338 entitled "Method and System for the Determination of the PSCN Parameter Starting From the MFN Parameter in a DECT Cordless Telephone System", to Rosella et al., issued Jul. 11, 2000, which are both incorporated herein by reference in their entirety.

It would be desirable to provide an alarm capability in the cordless phone system to eliminate the need for an alarm clock. Furthermore, it would be advantageous if the user interface for the alarm was simplified from conventional alarm clocks.

SUMMARY OF THE INVENTION

A method for transmitting an alarm over a cordless broadcast system having a base station in communication with a mobile unit and a computer is disclosed. The computer includes a speech recognition system. The method generally comprises requesting an alarm setting for a specified time with a voice command at the mobile unit and storing the requested alarm setting in the computer. The alarm is broadcast at the specified time to the mobile unit.

An alarm system for use in a cordless broadcast system generally comprises a plurality of mobile units and a base station operable to broadcast audio to the plurality of mobile units. A computer, coupled to the base station, includes a speech recognition system configured to recognize speech commands to enter an alarm setting. The computer is operable to store the alarm setting and initiate a broadcast of the alarm from the base station to a specified mobile unit.

In another aspect of the invention, an alarm system for use in a cordless telephone system generally comprises a plurality of cordless telephones and a base station having a controller operable to broadcast audio to the plurality of cordless telephones. The system further includes a computer coupled to the base station and having an alarm application operable to receive alarm settings specifying a time, type of audio signal, and the cordless telephone, and transmit the alarm to the base station at the specified time such that the base station broadcasts the specified type of audio signal to the specified cordless telephone.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
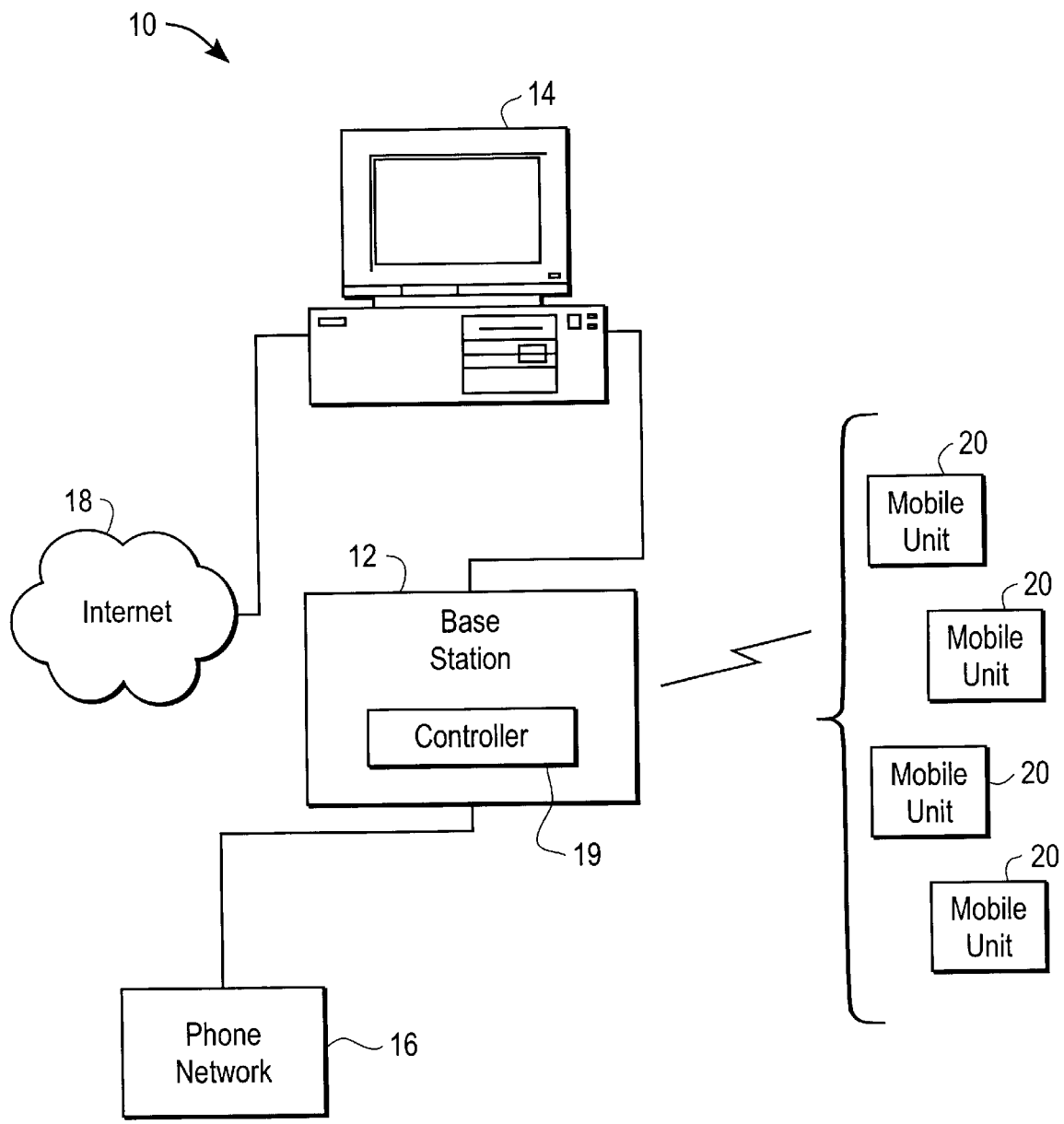
FIG. 1 is a schematic of a cordless phone alarm system of the present invention.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Referring now to the drawings, and first to FIG. I a cordless phone alarm system of the present invention is shown and generally indicated at 10. The system includes a cordless phone system comprising a base station 12 coupled to a computer 14 and a conventional telephone network 16. The network 16 may also be a network of base stations 12. The base station 12 is in communication with a plurality of mobile units 20 and provides communications between the plurality of units and the network 16. Although only four mobile units 20 are illustrated, other numbers of units are possible. In a preferred embodiment the mobile units 20 are cordless telephones configured to communicate with the phone network 16 through the base station 12. The base station 12 includes an alarm and call controller 19 which is configured to direct the alarm signal to an appropriate one of the plurality of mobile units 20. Different alarm signals may be directed to different mobile units 20 within a house. For example, a 6:00 am wake up alarm may be specified for the mobile unit 20 located in the master bedroom and a 7:00 am wake up signal directed to the mobile unit located in one of the children's bedrooms. There may also be a reminder alarm set for 2:00 pm for the mobile unit located in the kitchen to remind a parent to pick up the children from school. The controller 19 may also be configured to simultaneously send an alarm signal to two or more of the mobile units 20.

The mobile units 20 are configured to support a broadcast mode which allows the units to receive an audio alarm signal broadcast from the base station 12. Time Division Multiple Access (TDMA) is preferably used to provide communication between each of the plurality of cordless phones 20 and the base station 12.

Figure 2:
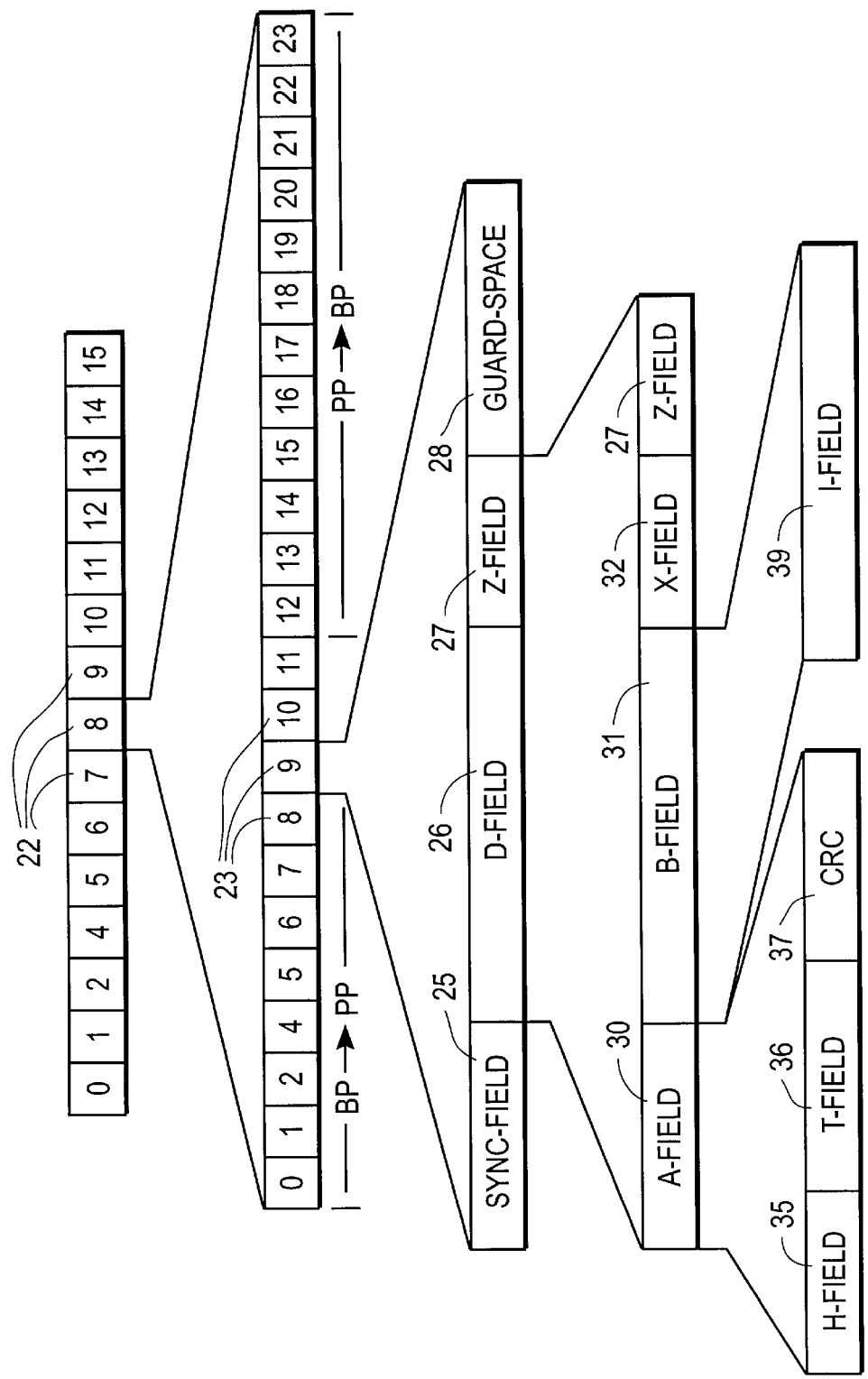
FIG. 2 is a schematic illustrating an exemplary DECT frame structure for the cordless phone system.

FIG. 2 illustrates a DECT frame structure that uses TDMA and may be used in an embodiment of the invention. As shown in FIG. 2, a multiframe contains sixteen frames 22, each frame having a length of 10 milliseconds. Each frame 22 of the multiframe may be split into two sets of twelve full time slots 23 of equal size. The base station 12 transmits to the plurality of mobile units 20 for the first 5 ms, corresponding to slots 0 to 11 (illustrated as the BP to PP (base station to portable unit transmission)). For the second 5 ms corresponding to slots 12 to 23 (illustrated as the PP to BP (base station to portable unit transmission)) the base station 12 receives transmissions from the plurality of portable units 20. A pair of transmitting/receiving time slots, such as slots 0 and 12, or 1 and 13 form a connection (channel). Each mobile unit 20 is assigned a slot from the first 5 ms and a slot from the second 5 ms to provide a channel for each unit. Since there are twelve channels, the base station 12 can accommodate twelve portable units using this exemplary format.

Each time slot may last, for example, for 416 $\mu$s, which corresponds to 480 bits. Each time slot may be split into a 32 bit synchronization field (sync-field) 25, a 388 bit D-field 26, a four bit Z-field 27, and a 56 bit guard space 28. The D-field 26 includes a 64 bit A-field 30, a 320 bit B-field 31, and a four bit X-field 32. The A-field 30 includes an eight bit header (H-field) 35, a 40 bit tail (T-field) 36, and a 16 bit cyclic redundancy check (CRC) 37. The B-field 31 includes a 320 bit information field (I-field) 39. The I-field may be used to carry data, such as part of a digitized audio message. The header describes information in the tail. Various commands and command information, such as identification commands, frequency information, slot/time information, and slot commands may be placed in the tail. The base station 12 and mobile units 20 receive messages and process the commands in the tail. Additional details of a cordless phone system that may be used with the present invention are provided in U.S. patent application Ser. No. 09/779,014 (Attorney Docket No. 99 E 7613US), entitled Audio Broadcast in Cordless Digital System, by Sydon et al., which is incorporated herein by reference in its entirety. It is to be understood that the cordless phone system may be different than described and shown herein without departing from the scope of the invention.

Figure 3:
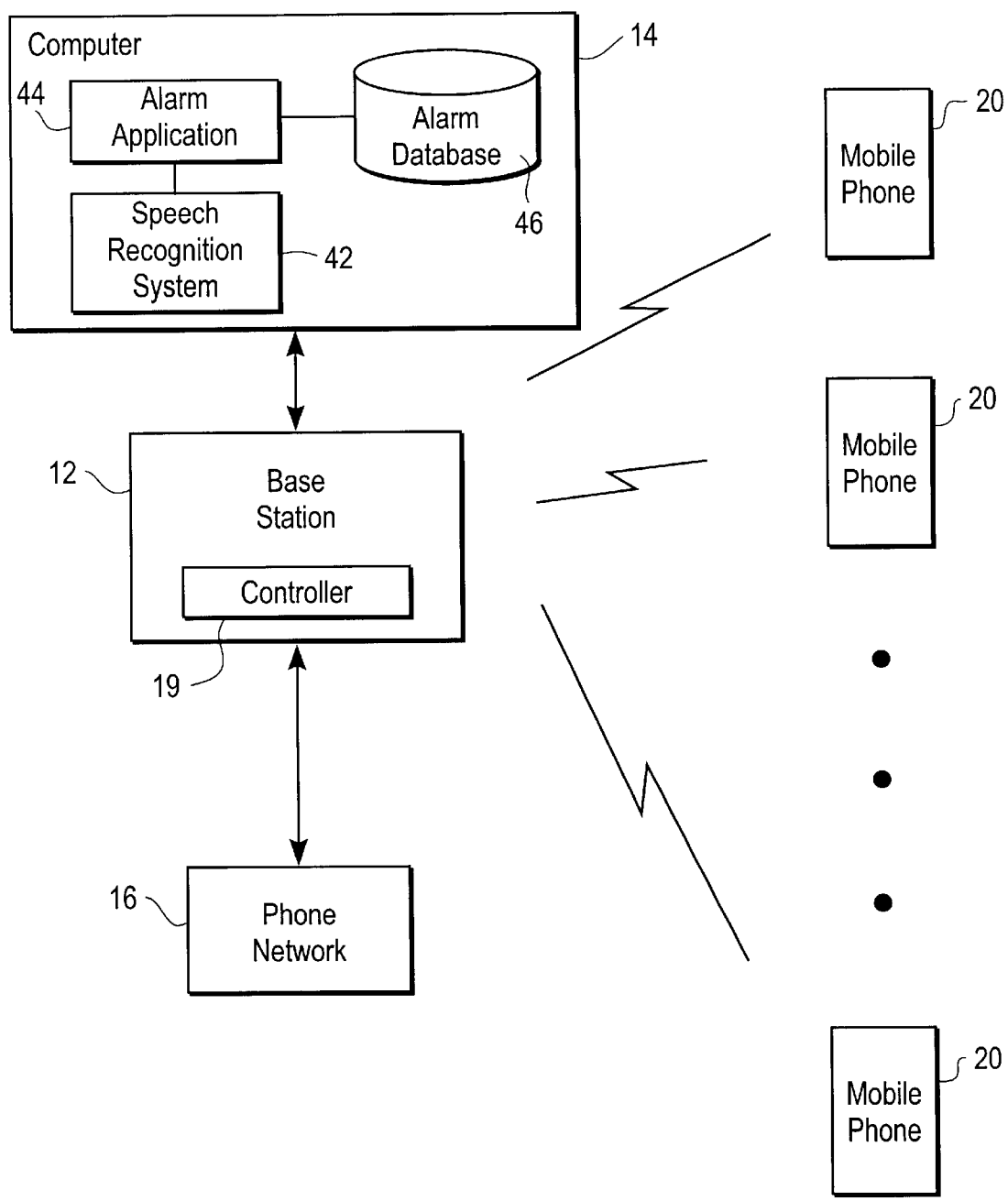
FIG. 3 is a block diagram illustrating additional detail of the cordless phone alarm system of FIG. 1.

FIG. 3 is a block diagram illustrating additional detail of the alarm system. The computer 14 includes a speech recognition system 42, an alarm application 44, and an alarm database 46. The speech recognition system 42 is used to analyze speech input from a user to determine user selection and includes a speech recognition program, database, and a data processing system (engine). The speech recognition program converts voice commands received at the computer 14 into keystrokes or commands understandable by the program. Speech signals are processed and converted into digital data by the speech recognition engine. The engine receives an audio signal which is converted to a corresponding electrical format, and then is electrically conditioned into a form suitable for digital sampling. Once the audio speech signal has been converted to a representative electrical signal, it is received by an analog-to-digital (A/D) converter. The A/D converter samples the representative electrical signal at a suitable sampling rate, and outputs a digitized audio signal. The digitized audio signal is then processed to extract various time-domain and frequency-domain sound characteristics, that are used as a basis for identifying a particular phoneme sound type that is contained within the audio speech signal. The speech recognition system 42 is configured to recognize certain words and phrases. The speech database contains a list of commands that the system recognizes. These commands may include, for example, "wake me up at ", "set alarm for ", "standard alarm", "weather report", "news", "radio station ", "audio file ", or variations thereof. It is to be understood that various types of speech recognition systems may be used, as is well known by those skilled in the art.

The alarm application 44 interfaces with the mobile units 20 through the base station 12. The alarm application 44 includes a user interface that is operable through the speech recognition system 42, to receive commands and input commands to enter an alarm setting. For example, a user may want a wake up call at 7:00 am at the mobile unit 20 located in a bedroom of the house. In addition to specifying a time for the alarm, the user may also specify the type of signal to be played at the selected time. The audio played by the mobile phone 20 may be a real audio broadcast or a prerecorded WAV file stored in the computer 14. For example, the user may want to hear the weather report, local news, a radio station, or prerecorded audio. The mobile unit 20 is configured to broadcast radio or streaming audio so that the alarm can provide real time audio as the alarm signal. The computer 14 obtains the live audio from the Internet 18. The alarm signal may also be a standard buzzer provided by the base station 12.

The alarm application 44 is configured to interface with more than one mobile unit 20 so that multiple alarms may be set throughout the house and at different times during the day. Each mobile unit 20 is assigned a unit identifier so that when the alarm is set, the alarm application recognizes the mobile unit from which the alarm is set. The alarm application 44 may also be configured such that a user can set an alarm for a different mobile unit 20 than the one from which he is setting the alarm. The alarm may also be set by the user at the computer 14 by a keyboard, microphone, or other input device. The computer 14 stores the alarm setting in the alarm database 46, which contains the time for each alarm, the recurrence for each alarm (e.g., every day, every weekday, every Sunday), the mobile unit identifier (or identifiers) to which the alarm is to be broadcast, and the type of alarm signal that is to be broadcast (e.g., news, weather, sports, music, bird noises, buzzer, etc.).

Figure 4:
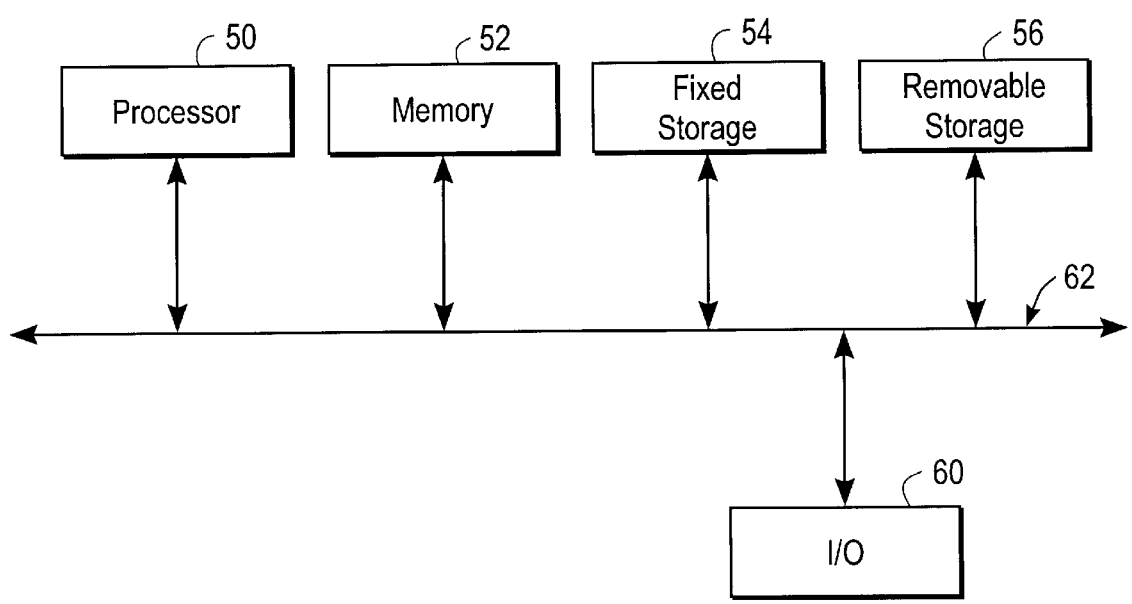
FIG. 4 is a schematic illustrating an example of a computer system that can be used in the alarm system of FIG. 1.

FIG. 4 shows a system block diagram of computer system 14 that may be used in the alarm system of the present invention. The computer system 14 includes memory 52 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 14 further includes subsystems such as a central processor 50, fixed storage 54 (e.g., hard drive), removable storage 56 (e.g., CD-ROM drive), and one or more input/output devices 60 and network interfaces. Other computer systems suitable for use with the invention may include additional or fewer subsystems. For example, computer system 14 may include more than one processor 50 (i.e., a multi-processor system) or a cache memory. The computer system 14 may also include a display, keyboard, and mouse for direct input to the alarm database.

The system bus architecture of computer system 20 is represented by arrows 62 in FIG. 4. However, these arrows are only illustrative of one possible interconnection scheme serving to link the subsystems. For example, a local bus may be utilized to connect the central processor 50 to the system memory 52. Computer system 14 shown in FIG. 4 is only one example of a computer system suitable for use with the invention. Other computer architectures having different configurations or subsystems may also be utilized As previously described, the mobile unit 20 is configured to receive broadcast from the Internet in real time. When the base station is set to a broadcast mode, a system channel, such as 23, is set to transmit. If the computer is receiving a streaming audio signal from the Internet, the audio signal is sent to the controller 19 included in the base station 12. The controller 19 sets at least one system channel to broadcast whereas the remaining channels are set to receive a telephone call. The mobile unit 20 receives the streaming audio broadcast and when a call is received, the controller 19 switches the received call to one of the remaining channels assigned to receive calls. This allows the mobile unit 20 to switch from receiving the alarm signal to receiving a phone call. Once the call has been completed, the controller 19 can switch back to the system channel dedicated to broadcasting the alarm signal.

Figure 5:
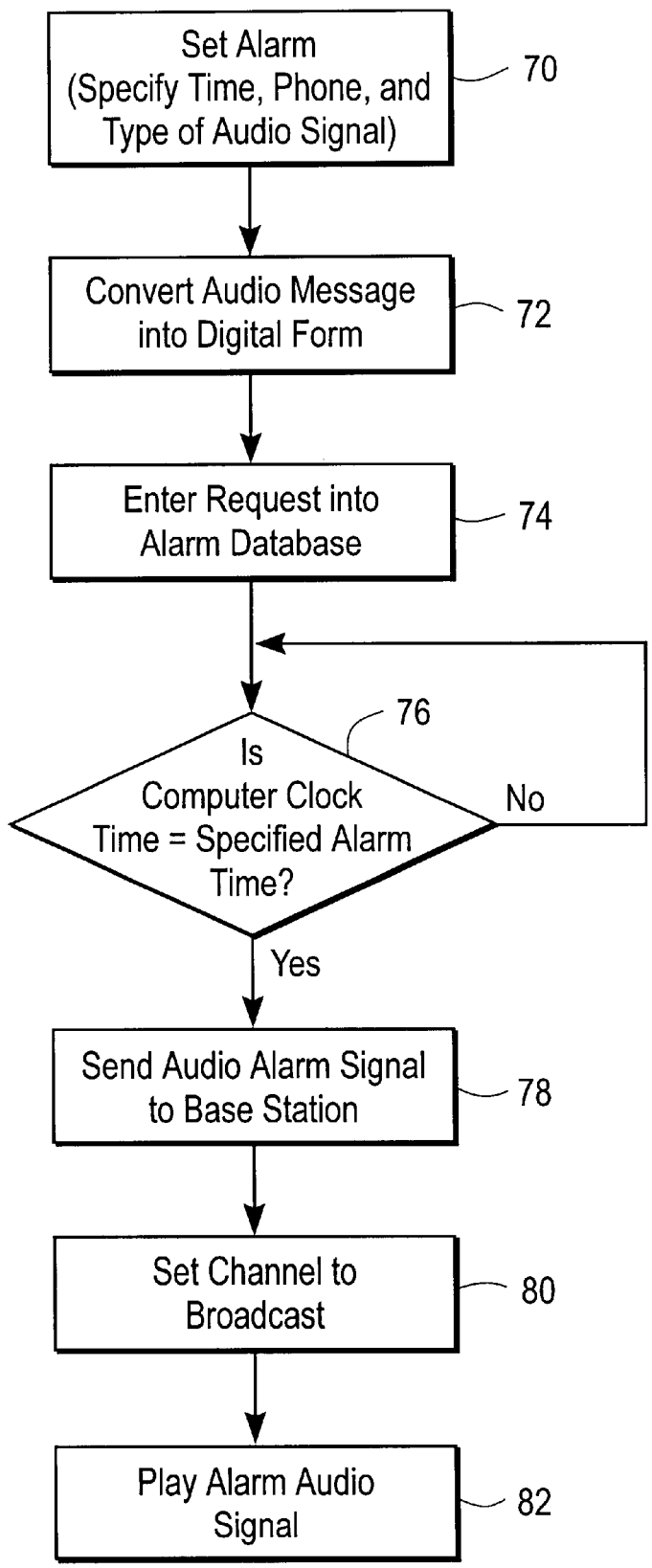
FIG. 5 is a flowchart illustrating a process of the present invention for setting an alarm and broadcasting an audio alarm signal to a mobile unit.

FIG. 5 is a flowchart illustrating a process of the present invention for using the cordless telephone system to broadcast an alarm to one or more of the cordless phones 20. The user first sets an alarm by communicating with the computer 14 from one of the cordless phones 20 through the base station 12 (step 70). For example, the user may say into the phone "Wake me at 7:00 am with weather report." The speech recognition system 42 converts the audio message into a digital form that is recognized by the computer 14, as described above (step 72). The alarm request is entered into the alarm database 46 stored on the computer 14. When the internal clock on the computer turns to 7:00 am, the alarm for the specified cordless phone 20 is sent to the base station 12 (steps 76 and 78). The controller 19 prepares the base station 12 to broadcast by dedicating a channel to broadcast to the specified cordless phone 20 (step 80). The audio alarm signal is then played over the phone 20 (step 82). After the user receives the alarm he may continue to listen to the broadcast or turn off the alarm by entering a command into the phone 20 either by speech or manual input.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for transmitting an alarm over a cordless broadcast system having a base station in communication with a mobile unit and a computer, the computer including a speech recognition system, the method comprising:

requesting an alarm setting for a specified time with a voice command at the mobile unit;

storing the requested alarm setting in the computer; and broadcasting the alarm at the specified time to the mobile unit.

2. The method of claim 1 wherein the mobile unit is a cordless telephone and the base station is in communication with a phone network.

3. The method of claim 2 further comprising receiving a phone call on the mobile unit.

4. The method of claim 1 further comprising placing the mobile unit in a broadcast receiving mode at the specified time.

5. The method of claim 1 further comprising setting the base station to a broadcast mode at the specified time.

6. The method of claim 1 wherein requesting an alarm setting further comprises requesting an audio signal for the alarm.

7. The method of claim 6 wherein requesting an audio signal comprises requesting streaming audio.

8. The method of claim 6 wherein requesting an audio signal comprises requesting a live audio broadcast from the Internet.

9. The method of claim 6 wherein requesting an audio signal comprises requesting a prerecorded file.

10. The method of claim 9 wherein the prerecorded file is a WAV file stored on the computer.

11. The method of claim 1 wherein the broadcast system comprises a plurality of mobile units.

12. The method of claim 11 wherein each of said plurality of mobile units has a specific mobile unit identifier.

13. The method of claim 12 wherein requesting an alarm setting comprises specifying the mobile unit identifier.

14. The method of claim 11 wherein broadcasting the alarm comprises transmitting the alarm to two or more of said plurality of mobile units.

15. An alarm system for use in a cordless broadcast system, comprising:

a plurality of mobile units;

a base station operable to broadcast an audio alarm signal to said plurality of mobile units; and a computer coupled to the base station and having a speech recognition system configured to recognize speech commands to enter an alarm setting, the computer operable to store said alarm setting and initiate a broadcast of the alarm from the base station to a specified mobile unit.

16. The system of claim 15 wherein the base station is in communication with a telephone network and said plurality of mobile units are cordless telephones.

17. The system of claim 16 wherein the base station includes a controller operable to select a channel to transmit the alarm and select a channel for receiving a phone call.

18. The system of claim 15 wherein the alarm setting includes a selected audio signal.

19. The system of claim 18 wherein the selected audio signal is a streaming audio signal.

20. The system of claim 18 wherein the selected audio signal is a live audio broadcast from the Internet.

21. The system of claim 18 wherein the selected audio signal is a prerecorded file.

22. The system of claim 21 wherein the prerecorded file is a WAV file stored on the computer.

23. The system of claim 15 wherein each of said plurality of mobile units has a specific mobile unit identifier.

24. The system of claim 15 wherein the alarm setting includes the mobile unit identifier.

* * * * *